(12) United States Patent
Schultz

(10) Patent No.: US 6,340,905 B1
(45) Date of Patent: Jan. 22, 2002

(54) DYNAMICALLY MINIMIZING CLOCK TREE SKEW IN AN INTEGRATED CIRCUIT

(75) Inventor: Richard T. Schultz, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/596,677

(22) Filed: Jun. 19, 2000

(51) Int. Cl.[7] .................................................. G06F 1/04
(52) U.S. Cl. ........................................ 327/161; 327/293
(58) Field of Search ................................. 327/141, 144, 327/161, 162, 163, 158, 293, 294, 295

(56) References Cited

U.S. PATENT DOCUMENTS

| | | | | |
|---|---|---|---|---|
| 5,528,187 A | * | 6/1996 | Sato et al. ................... | 327/292 |
| 5,563,554 A | * | 10/1996 | Mizuno ....................... | 331/158 |
| 5,666,079 A | * | 9/1997 | Ma ............................. | 327/276 |

* cited by examiner

Primary Examiner—Timothy P. Callahan
Assistant Examiner—Linh M. Nguyen
(74) Attorney, Agent, or Firm—John R. Ley, L.L.C.

(57) ABSTRACT

A clock tree deskew circuit dynamically minimizes skew in clock signals that synchronize operation of synchronized circuit components of an integrated circuit. The clock tree deskew circuit reduces the clock tree skew in repeated intervals over a period of time. The clock tree deskew circuit is then turned off to prevent unnecessary further adjustments to the clock signals, but can be turned back on when conditions change that alter the clock tree skew. The clock signals are paired together in a continuous loop, such that each clock signal is the first clock signal of the pair when paired with the next clock signal and is the second clock signal when paired with the one before it. The clock tree deskew circuit detects the absolute skew between each pair of the clock signals. The clock tree deskew circuit adjusts the first clock signal of each pair toward the second clock signal of the pair to reduce the skew between the two clock signals. After a predetermined number of adjustment cycles, the overall clock skew is minimized by repeated adjustments.

32 Claims, 5 Drawing Sheets

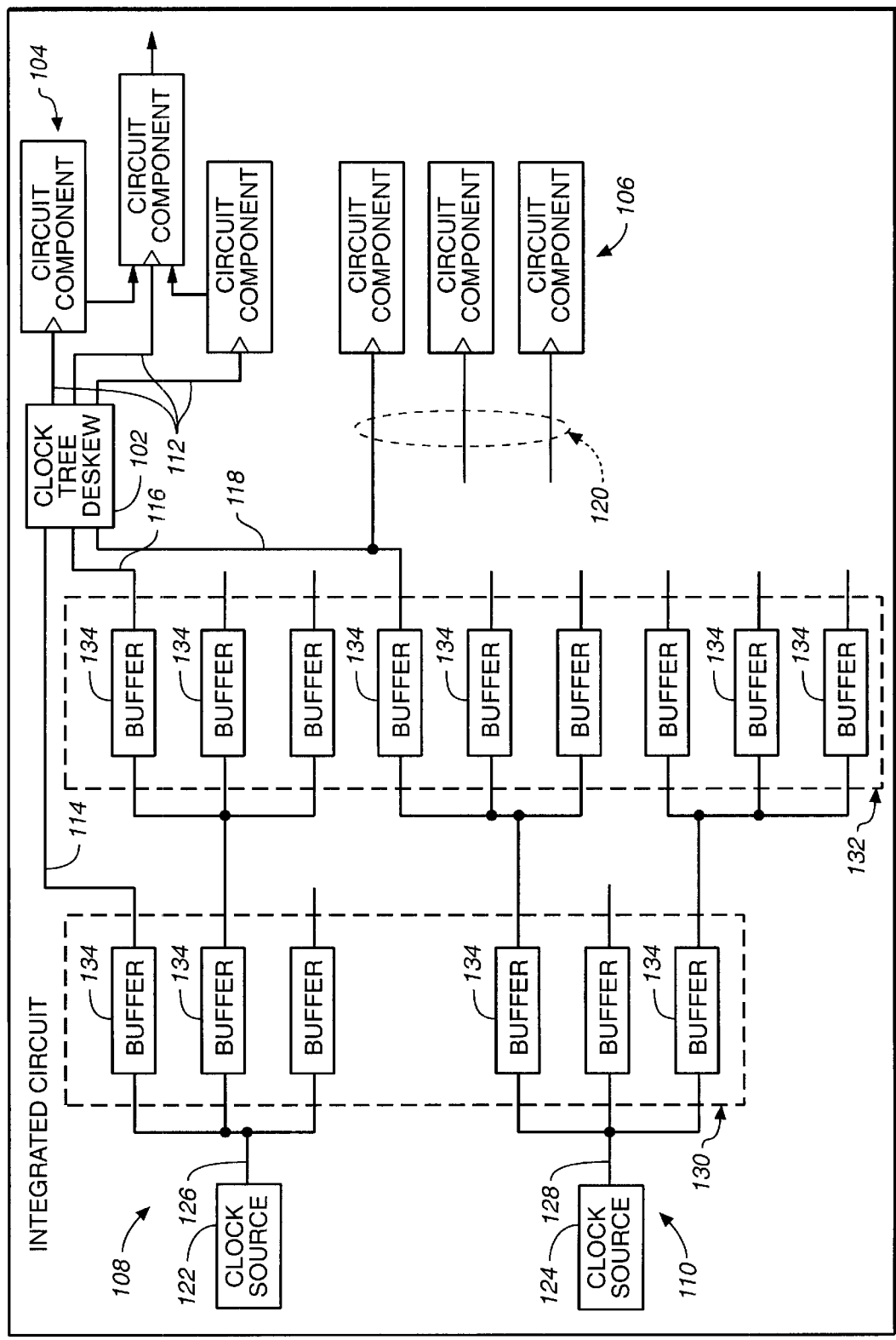
FIG._1

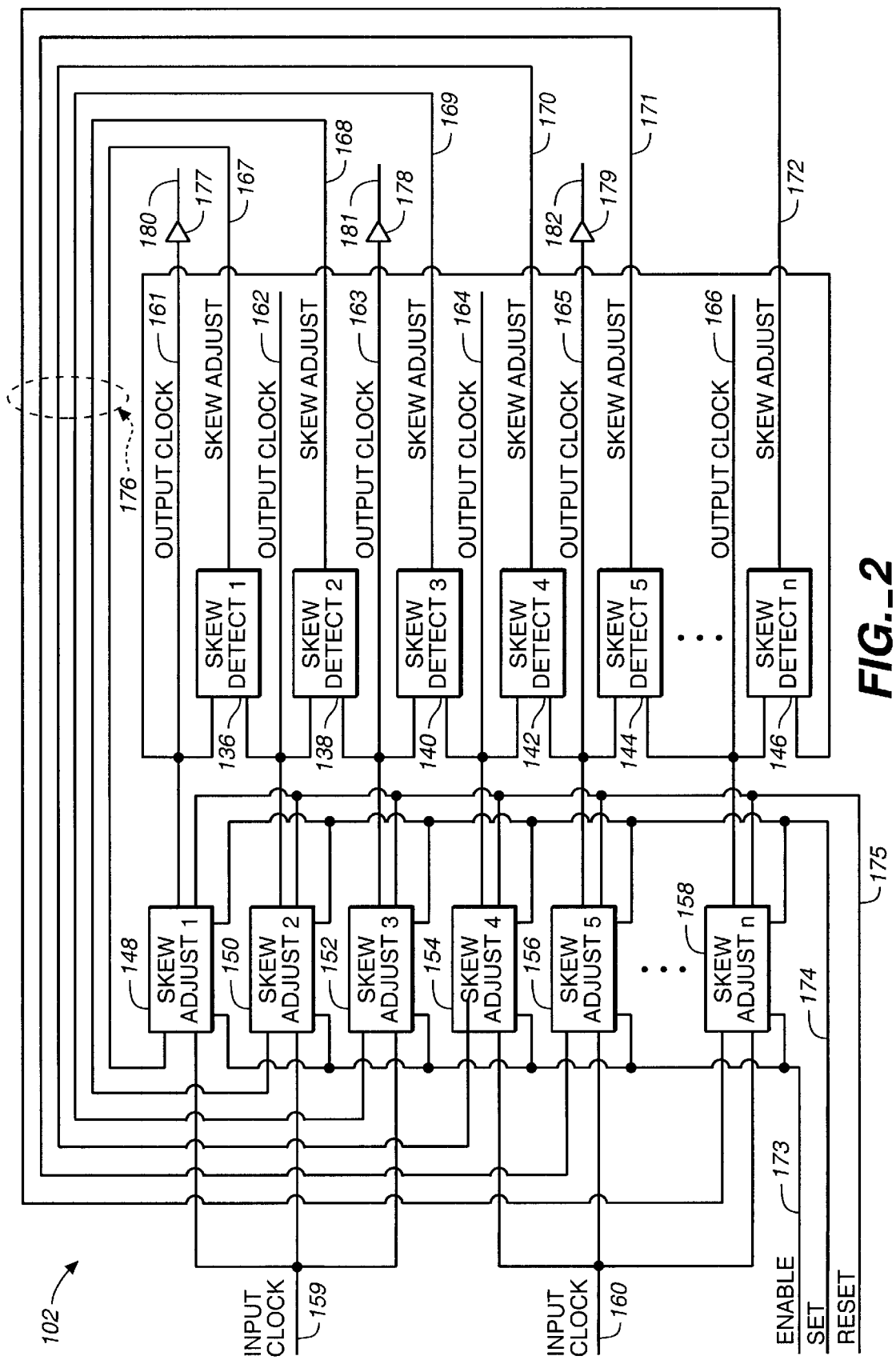
FIG._2

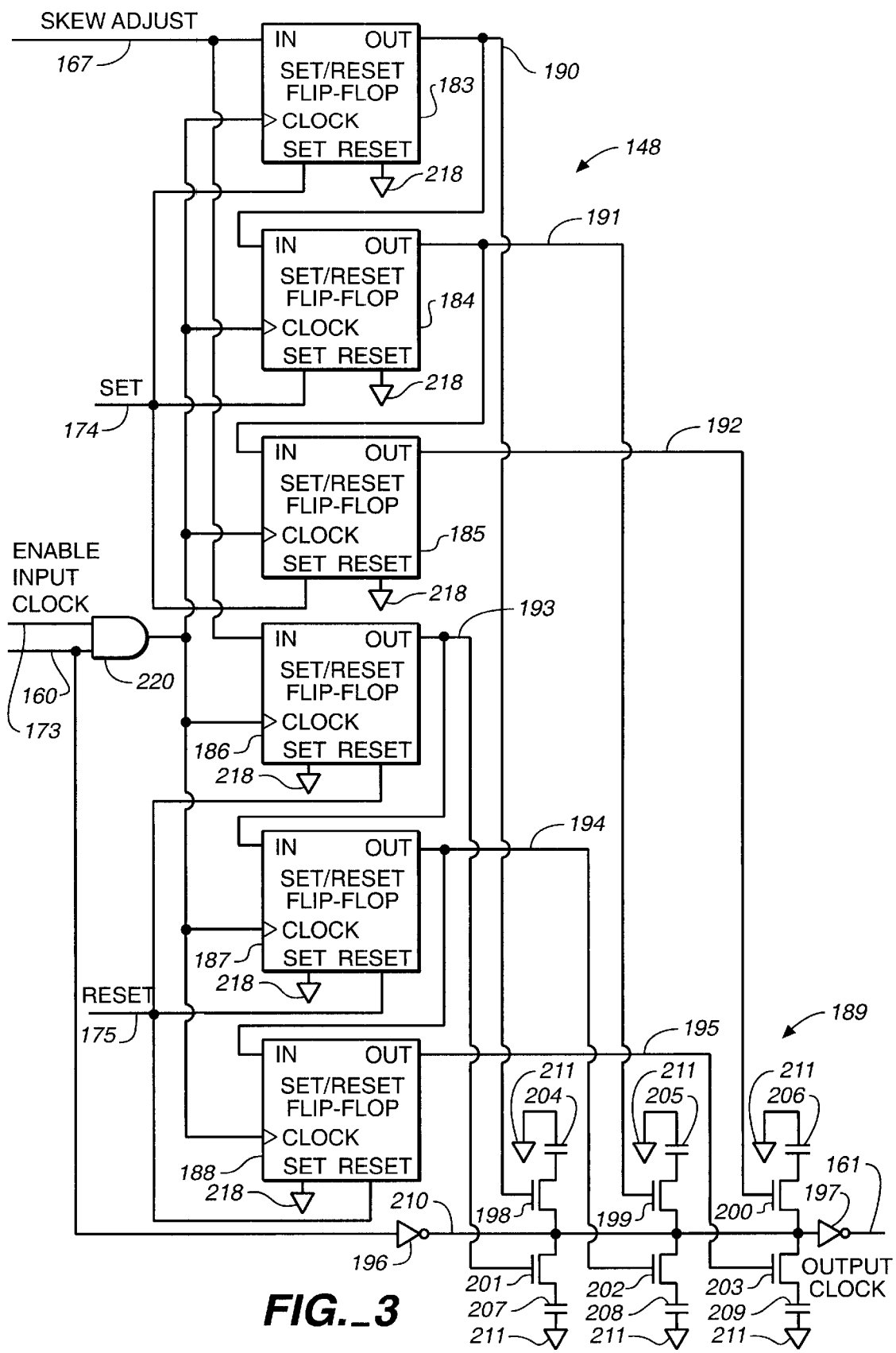
FIG._3

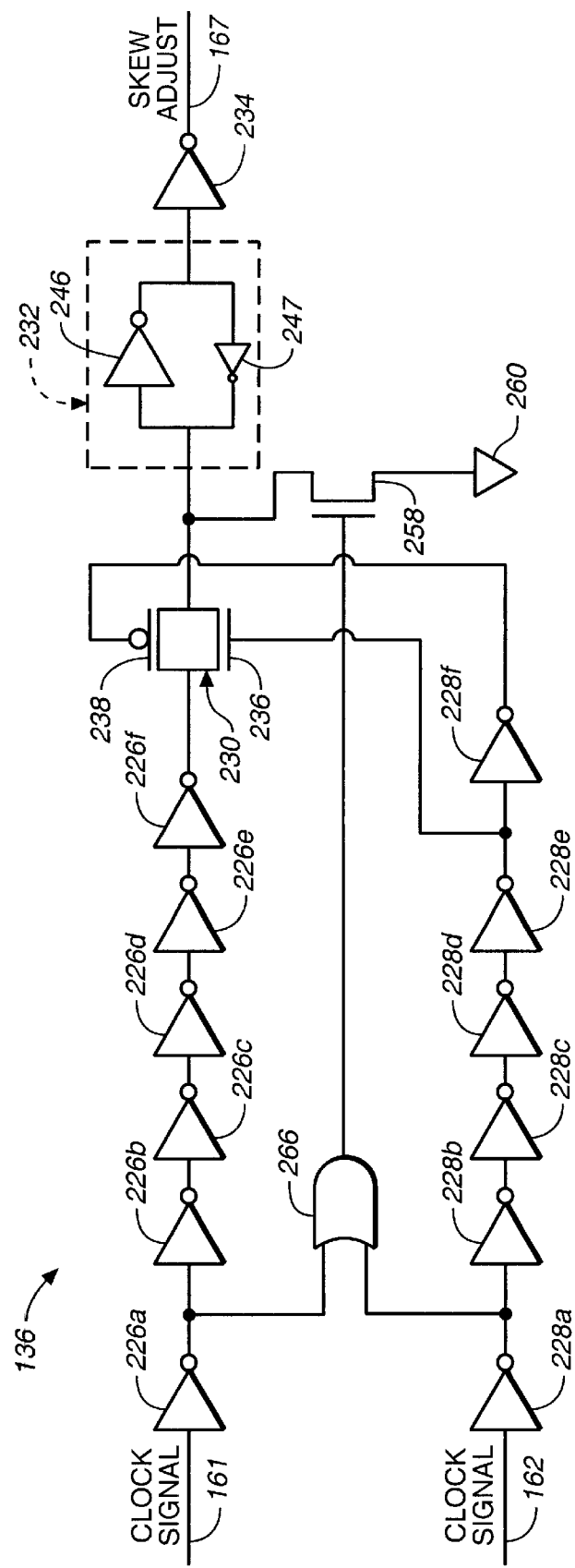
FIG._4

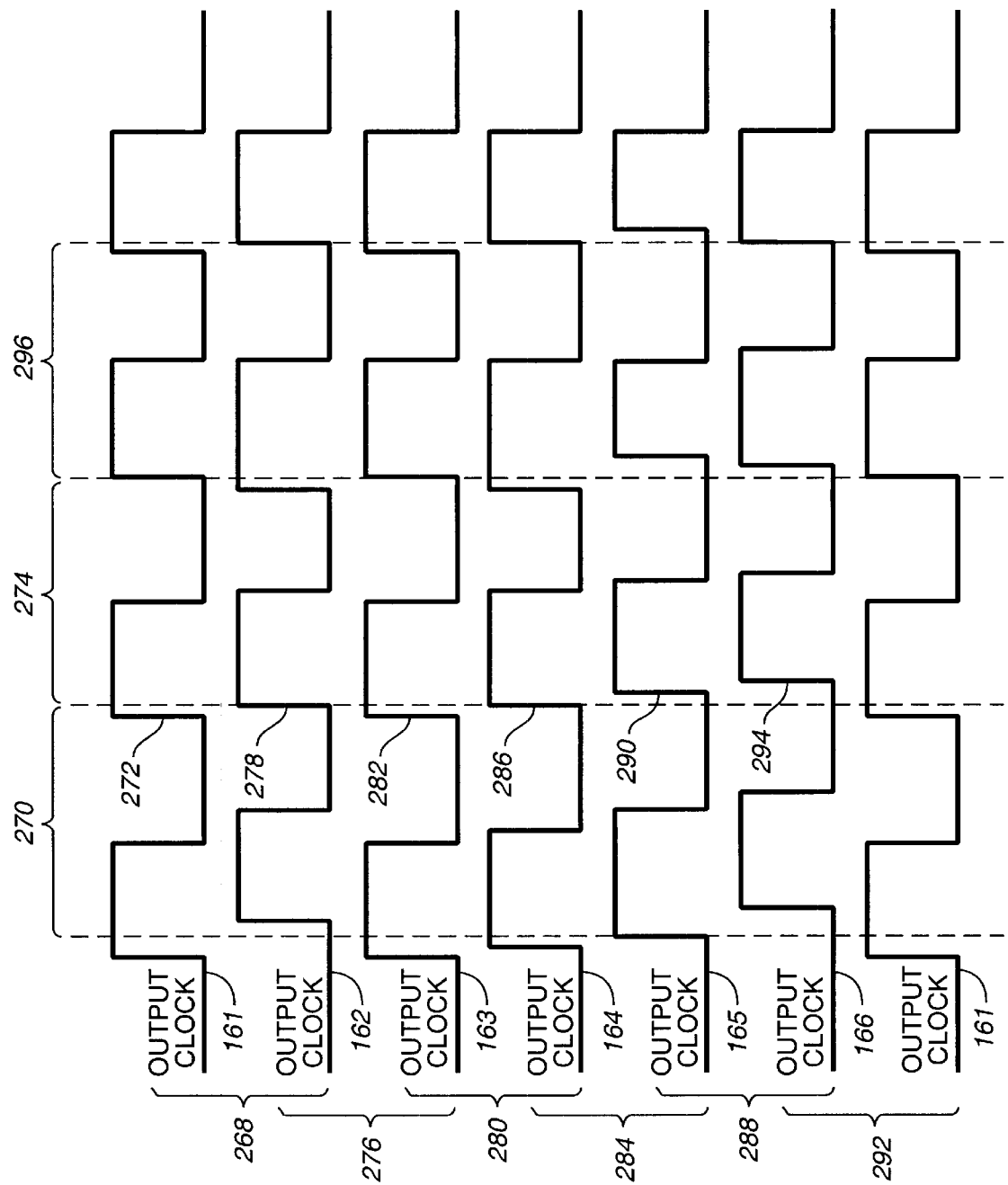
FIG._5

DYNAMICALLY MINIMIZING CLOCK TREE SKEW IN AN INTEGRATED CIRCUIT

FIELD OF THE INVENTION

This invention relates to integrated circuit (IC) chips and the clock signals used throughout the IC to drive, or "clock," various active components on the IC. More particularly, the present invention relates to clock deskewing circuitry for minimizing undesirable skew, or offset, between coordinated clock signals for clocking related components of the IC. An advantage of the present invention is that the IC self-corrects skewed clock signals independent of the effects of temperature, voltage or fabrication process.

BACKGROUND OF THE INVENTION

Conventional integrated circuits (ICs) use a clock signal and branch it out through a series of buffers to form a plurality of clock signals. The structure of the branching of the clock signal is called a "clock tree." One or more clock trees can be present in a single IC. For example, a clock signal at a given branch, or level, of the clock tree may feed into three buffers to produce three clock signals at the next level, which may each feed into three more buffers to produce nine clock signals at the third level. The clock signals at any level of the clock tree are sent to various synchronous components of the IC to coordinate the functions of these components. For various reasons, however, any two clock signals, even at the same level of the same clock tree, may be slightly different or offset from each other. This difference in clock signals is called "clock skew," and differences throughout several clock signals of any level of the clock tree is called "clock tree skew."

Clock tree skew has several causes. For example, the buffers between levels in the clock tree typically introduce a delay between their input and output clock signals, so clock signals at different levels of the clock tree are usually naturally skewed from each other. Additionally, the load experienced by one clock signal may introduce a delay into the clock signal different from that of another load on another clock signal. Furthermore, changes in temperature, different applied voltages and differing semiconductor fabrication processes can affect the clock skew.

Occasionally, the skew between two clock signals is introduced intentionally to precisely coordinate the operation of two components in the IC. Often, however, the skew must be reduced or eliminated for the IC to operate at a desired high operating clock frequency, where all or a portion of the synchronous components of the IC must switch states simultaneously or synchronously.

Common IC fabrication techniques try to minimize clock tree skew by resizing buffers in the clock tree to move some of the clock signals forward or backward or by adding redundant loads to the circuits to balance the loading of the clock tree. Either technique alters the delay of some of the clock signals by a specified amount that is determined by analysis of the timing of the clock signals. Such techniques typically result in a minimum clock skew of about 200 to 400 picoseconds after the clock trees have been placed, resized and routed through the IC chip. However, the 200 to 400 picosecond skew is usually a nominal target value that is still sometimes too large for high-speed operation of some ICs, such as many Application-Specific Integrated Circuits (ASICs). With temperature changes, different applied voltages, differing silicon fabrication processes and/or inadequate tolerances in the silicon fabrication processes, the clock skew can even vary significantly from the nominal value. Due to this variation in clock skew, such ICs will often fail speed testing and not meet performance targets. As a result, IC fabrication yields will be low and costs will be high.

It is with respect to these and other background considerations that the present invention has evolved.

SUMMARY OF THE INVENTION

The present invention enables dynamic self-detection and correction of clock tree skew in an integrated circuit (IC). Clock skew variations due to temperature changes, different applied voltages and different semiconductor fabrication processes are also corrected. Thus, as clock skew increases or decreases during operation of the IC, the present invention dynamically detects and corrects the changing clock skew on-the-fly. In this manner, the adjustment of each clock signal in a clock tree does not rely on a single determination and adjustment of the anticipated clock skew during the design of the IC, but is altered and re-altered as is dynamically determined to be appropriate by a skew detection and adjustment circuitry, particularly in response to differences in applied voltage, temperature and fabrication process.

In the skew detection and adjustment circuitry of the present invention, each clock signal in a clock tree is paired with another clock signal in the clock tree. The absolute skew between the two clock signals in each pair is detected, and one of the clock signals of each pair is adjusted forward or backward as appropriate. Such adjustment of one of the clock signals of the pair is performed by adding or subtracting a certain amount of delay from the adjusted clock signal. The detection and adjustment is repeated in increments as necessary to reach an acceptable minimum skew. Thus, the invention has the advantage of automatically correcting for almost any amount of clock skew. Additionally, since the skew detection and adjustment circuitry dynamically detects and corrects absolute skew between any two clock signals, the invention has the further advantage of automatically correcting for clock skew variations due to different applied voltages and/or different semiconductor fabrication processes that could not be anticipated during the design of the IC.

The detection and adjustment is also preferably performed during the operation of the IC to account for changing clock skew patterns. Thus, the invention has the additional advantage of continuing to operate at a high speed under changing conditions, such as changing ambient temperature.

These and other improvements are achieved in an IC comprising a clock tree, a plurality of synchronized circuit components and a clock tree deskew circuit. The clock tree includes a plurality of levels of clock signals, some of which operate the synchronized circuit components. Each clock signal has a delay characteristic relative to the other clock signals, which together define a clock tree skew. The clock tree deskew circuit is connected to the clock tree and the synchronized circuit components to intercept clock signals that are received by the synchronized circuit components. The clock tree deskew circuit determines the skew between pairs of the clock signals and changes the delay characteristic of one of the clock signals of at least one of the pairs to reduce the clock tree skew.

The clock tree deskew circuit preferably includes a plurality of skew adjust circuits and a corresponding plurality of skew detect circuits. The clock tree deskew circuit also preferably sends output clock signals to the synchronized circuit components. Each skew adjust circuit corresponds to and produces one of the output clock signals. The skew detect circuits connect to their corresponding skew adjust circuits to receive the corresponding output clock signal. Each skew detect circuit also receives one of the other output clock signals. Each skew detect circuit produces an adjustment signal to its corresponding skew adjust circuit indicative of whether the corresponding output clock signal preceded the other output clock signal. Each skew adjust circuit preferably receives the adjustment signal and shifts the corresponding output clock signal accordingly.

The clock tree deskew circuit preferably repeatedly determines the skew between the pairs of clock signals and repeatedly changes the delay characteristic of one of the clock signals of at least one of the pairs to minimize the clock tree skew over a period of time. After the period of time has elapsed, the clock tree deskew circuit preferably stops changing the delay characteristics of the clock signals. Then, when a condition of the IC changes that alters the delay characteristics of any of the clock signals, the clock tree deskew circuit preferably restarts the changing of the delay characteristics of the clock signals to minimize the clock tree skew again.

The previously mentioned and other improvements are also achieved in a method of controlling the skew between clock signals in an integrated circuit having a plurality of synchronized circuit components. The clock signals are generated in a plurality of levels of a clock tree. Each clock signal is paired with at least one other clock signal. The clock signal that precedes the other clock signal of each pair is detected. The timing is changed for one of the clock signals of at least one pair to reduce the skew between the clock signals of that pair. The skew between the clock signals is preferably minimized by repeating the adjustment over a period of time, and then preferably discontinuing the adjustments. The adjustments are preferably restarted when conditions change in order to minimize the skew again.

These and other improvements are also achieved in a clock tree deskew circuit for deskewing clock signals of a clock tree that synchronize operation of synchronized circuit components in an IC. The clock tree deskew circuit comprises a plurality of clock signal inputs, a plurality of skew adjust circuits and a plurality of skew detect circuits. The clock signal inputs receive clock signals from the clock tree. The skew adjust circuits each buffer and delay a corresponding clock signal. Each skew detect circuit receives the corresponding buffered clock signal from a corresponding skew adjust circuit plus one other clock signal from one of the other skew adjust circuits. Each skew detect circuit determines whether the corresponding clock signal preceded or followed the other clock signal and issues an adjustment signal to the corresponding skew adjust circuit depending on which signal preceded the other. Each skew adjust circuit responds to the adjustment signal by adjusting the corresponding clock signal accordingly. The skew adjust circuits preferably minimize the clock tree skew by repeatedly adjusting the corresponding clock signals, while the skew detect circuits repeatedly determine which clock signal preceded the other and repeatedly issue the adjustment signals.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

BRIEF DESCRIPTION OF THE DRAWINGS

FIG. 1 is a block diagram of an integrated circuit (IC) which incorporates clock tree deskew circuitry of the present invention.

FIG. 2 is a block diagram of the clock tree deskew circuit shown in FIG. 1.

FIG. 3 is a block diagram of a skew adjust circuit of the clock tree deskew circuit shown in FIG. 2.

FIG. 4 is a block diagram of a skew detect circuit of the clock tree deskew circuit shown in FIG. 2.

FIG. 5 is a waveform timing diagram illustrating the deskewing of clock signals by the clock tree deskew circuit shown in FIG. 2.

DETAILED DESCRIPTION

An integrated circuit (IC) 100 incorporating the present invention generally includes at least one clock tree deskew circuit 102, various clocked circuit components 104 and 106 and at least one clock tree 108 and 110, as shown in FIG. 1. Usually, some of the circuit components 104 must be synchronized in order to cooperate together to perform a particular logic function of the IC 100. In other words, the synchronous circuit components 104 have certain timing requirements for the clock signals (synchronized clock signals 112) that control the circuit components 104. Rigid adherence to the timing requirements ensures that the IC 100, and particularly the synchronous circuit components 104, can operate at a desired high clock frequency. The clock tree deskew circuit 102, therefore, receives various clock signals 114, 116 and 118 from the clock tree 108 and/or 110, minimizes any skew that may exist between these clock signals 1 14, 116 and 118 and supplies them as the synchronized clock signals 112 that control the synchronous circuit components 104. Alternatively, a known skew may be added to one or more of the synchronized clock signals 112 for proper timing of the synchronous circuit components 104. The other clocked circuit components 106 either do not require their clock signals 120 to be synchronized with other clock signals or utilize another clock tree deskew circuit (not shown) to synchronize their clock signals 120.

The clock trees 108 and 110 typically originate at conventional clock sources 122 and 124, respectively. The clock sources 122 and 124 send clock signals 126 and 128, respectively, to a series of levels, or branches, 130 and 132 of the clock trees 108 and 110, respectively. FIG. 1 shows only two levels 130 and 132 of the clock trees 108 and 110, but any number of levels may be used as is appropriate for the IC 100. Each level 130 and 132 includes conventional buffers, or inverters, 134 that pass along the clock signals 126 and 128 to the next level. The clock tree deskew circuit 102 may also function as one or more of the buffers 134.

Each clock signal 126 and 128 is typically sent to a plurality of the buffers 134 at level 130, and the output signal of each buffer 134 at level 130 is typically sent to a plurality of the buffers 134 at level 132. In this manner, the clock signals 126 and 128 "fan out" into many clock signals, such as the clock signals 114, 116, 118 and 120, forming the clock tree. The many clock signals are sent to the clocked components, such as circuit components 104 and 106, throughout the IC 100.

The many clock signals that are sent to the clocked components throughout the IC 100 are supplied at any level of the clock trees 108 and 110, including at the level of the clock signals 126 and 128. For example, clock signal 114 is supplied from one of the buffers 134 at level 130 of clock tree 108, clock signal 116 is supplied from one of the buffers 134 at level 132 of clock tree 108, and clock signal 118 is supplied from one of the buffers 134 at level 132 of clock tree 110.

Since these clock signals 114, 116 and 118 originate from different clock trees or different levels of the same clock tree, it is highly probable that there will be some amount of undesirable skew between each of these clock signals 114, 116 and 118. For example, clock signal 116 will likely have an additional delay, and therefore skew, over clock signal 114 since clock signal 116 has passed through an additional buffer 134 at level 132 of the clock tree 108, thereby adding a propagation delay to clock signal 116. Also, since clock signal 118 originates from a different clock tree than do clock signals 114 and 116, the timing of clock signal 118 will be unrelated to that of clock signals 114 and 116, so an undetermined amount of skew is likely between these signals.

Other causes of clock skew may exacerbate the above described skew which is due to the origination of the clock signals from different clock trees or different levels of the same clock tree. Such other causes of clock skew are typically due to temperature variations, circuit load variations, different applied voltages, different semiconductor fabrication processes and inadequate tolerances in the semiconductor fabrication process.

The temperature of the IC 100 can affect (increase or decrease) the delay in any of the clock signals passing through any of the buffers 134 or any of the circuit components 104 or 106. For example, if the IC 100 is incorporated in a mobile device (not shown), such as a cellular phone, then when the user operates the device while moving from a relatively cool environment inside a building to a hotter environment outside the building, or vice versa, the skew between clock signals in the IC 100 may suddenly change.

The circuit load, or impedance, to which each of the clock signals in the IC 100 is applied is typically quite different from that of any other clock signal. Different impedances, particularly capacitance and resistance, cause different delays in the clock signals.

The voltage that will be used to drive the IC 100 is frequently not known at the time of the design or fabrication of the IC 100 since the IC 100 may be incorporated in various different devices with different available voltages. The applied voltage, however, greatly affects the speed with which certain circuit elements, such as transistors (not shown) in the buffers 134, are driven on and off, thereby affecting the various delays in the clock signals.

Different semiconductor fabrication processes may be used to manufacture the IC 100, thereby resulting in different ICs 100 having certain circuit elements, such as the transistors, with different physical characteristics, even though the overall circuitry in the ICs 100 are the same. The different physical characteristics commonly cause the transistors to have different functional characteristics, such as different delay periods that affect the clock skew, which are not anticipated at the time the IC 100 is designed. Likewise, inadequate tolerances in the semiconductor fabrication process used to manufacture multiple ICs 100 result in ICs 100 with transistors that have different physical characteristics, and thereby unanticipated different clock skew patterns, even though the multiple ICs 100 were manufactured together.

The clock tree deskew circuit 102 corrects the undesired clock skew, regardless of the cause of the clock skew, including any of the above described causes. The clock tree deskew circuit 102 automatically detects the skew between any pair of the clock signals 114, 116 and 118 and dynamically adjusts one of the two clock signals for each pair a step toward the other. Repeated detections and adjustments minimize the clock skew between all of the clock signals 114, 116 and 118.

An exemplary clock tree deskew circuit 102 includes N skew detect circuits 136, 138, 140, 142, 144 and 146 and a corresponding N skew adjust circuits 148, 150, 152, 154, 156 and 158, as shown in FIG. 2. In this example, the clock tree deskew circuit 102 has two input clock signals 159 and 160 and N output clock signals 161, 162, 163, 164, 165 and 166.

Each skew adjust circuit 148 to 158 receives one of the input clock signals 159 or 160 and produces one of the output clock signals 161, 162, 163, 164, 165 or 166 therefrom. Each skew adjust circuit 148 to 158 also receives a skew adjust signal 167, 168, 169, 170, 171 or 172, respectively, from the corresponding skew detect circuit 136 to 146 and adjusts the delay of the output clock signal 161, 162, 163, 164, 165 or 166, respectively, in accordance therewith. Initially, the skew adjust circuits 148 to 158 produce the output clock signals 161, 162, 163, 164, 165 and 166 with a known amount of delay from the input clock signals 159 and 160. Thereafter, the skew adjust circuits 148 to 158 add or subtract delay to or from the output clock signals 161, 162, 163, 164, 165 or 166, respectively, to minimize the overall clock tree skew.

The skew adjust circuits 148 to 158 also receive an enable signal 173, a set signal 174 and a reset signal 175. These signals originate from a controller (not shown) that is either internal or external to the IC 100. When the controller turns "on" the enable signal 173, the skew adjust circuits 148 to 158 are enabled to perform the skew adjustment described above. When the controller turns "off" the enable signal 173, the skew adjust circuits 148 to 158 are disabled from making further adjustments. When disabled, the skew adjust circuits 148 to 158 maintain the timing or delays of the output clock signals 161, 162, 163, 164, 165 and 166, respectively, according to the last adjustment. Typically, the enable signal 173 is turned on for a predetermined number of clock cycles to permit the clock tree deskew circuit 102 to minimize the clock tree skew. Afterward, the enable signal 173 is turned off to prevent the clock tree deskew circuit 102 from unnecessarily attempting to further adjust the clock tree skew. The enable signal 173 is typically turned on for the predetermined number of clock cycles at initialization, or startup, of the IC 100 and when a condition (e.g. temperature) changes that may affect the clock tree skew.

The set signal 174 and reset signal 175 are logic signals that cause the skew adjust circuits 148 to 158 to set the output clock signals 161, 162, 163, 164, 165 and 166, respectively, to the known amount of delay from the input clock signals 159 and 160, as described above. Thus, the set signal 174 and the reset signal 175 are typically asserted by the controller (not shown) at initialization of the IC 100.

The skew detect circuits 136, 138, 140, 142, 144 and 146 each compare a pair of adjacent output clock signals 161, 162, 163, 164, 165 and 166 to detect which one of the pair arrived first, i.e. the absolute skew therebetween. For example, skew detect circuit 136 compares output clock signals 161 and 162, skew detect circuit 138 compares output clock signals 162 and 163 and so on down to the last skew detect circuit 146, which compares the last output clock signal 166 and the first output clock signal 161. Thus, the output clock signals 161, 162, 163, 164, 165 and 166 are arranged in overlapping pairs in a sequential loop.

The skew detect circuits 136, 138, 140, 142, 144 and 146 supply the skew adjust signals 167, 168, 169, 170, 171 and 172, respectively. Each skew adjust signal 167, 168, 169, 170, 171 and 172 is a logic 1 or 0 that indicates which of the output clock signals 161, 162, 163, 164, 165 and 166 of the pairs arrived first at the skew detect circuits 136, 138, 140, 142, 144 and 146, and thus, indicates whether delay needs to be added or subtracted to one of the clock signals of each pair. For example, if output clock signal 161 arrives at skew detect circuit 136 before output clock signal 162, then skew detect circuit 136 supplies a logic 1 for the skew adjust signal 167. Otherwise, skew detect circuit 136 supplies a logic 0 if output clock signal 162 arrives first.

The skew adjust signals 167, 168, 169, 170, 171 and 172 are fed back through feedback lines 176 to their corresponding skew adjust circuit 148 to 158. In response to their respective skew adjust signal 167, 168, 169, 170, 171 or 172, the skew adjust circuits 148 to 158 add or subtract delay to or from the output clock signals 161, 162, 163, 164, 165 and 166, respectively. For example, if skew adjust circuit 148 receives a logic 1 through skew adjust signal 167, which indicates that output clock signal 161 arrived at skew detect circuit 136 before output clock signal 162, then skew adjust circuit 148 adds delay to output clock signal 161 in the next clock cycle. Likewise, skew adjust circuit 148 subtracts delay from output clock signal 161 if skew adjust signal 167 is a logic 0. The addition and/or subtraction of delay is performed in known incremental steps and repeated over a certain number of clock cycles, so that after the clock cycles are completed, the overall clock tree skew of the output clock signals 161, 162, 163, 164, 165 and 166 will be minimized.

In some applications, it is actually desired to have some skew between clock signals that drive some of the synchronous circuit components 104 (FIG. 1). Such desired clock skew is known as "smart skew." Smart skew enables tight coordination of the timing of the synchronous circuit components 104 for high-speed operation of the IC 100 (FIG. 1). Therefore, the addition of smart skew to some of the output clock signals 161, 163 and 165 is illustrated by the connection of buffers, or inverters, 177, 178 and 179 in the paths of these output clock signals 161, 163 and 165. The buffers 177, 178 and 179 supply intentionally skewed output clock signals 180, 181 and 182, respectively.

In addition to deskewing the clock signals, the clock tree deskew circuit 102 also performs the "branching out" or "fan out" function of the buffers 134 (FIG. 1) to form the tree-like structure of the clock tree 108 or 110 (FIG. 1). In this example, the two input clock signals 159 and 160 fan out into the N output clock signals 161, 162, 163, 164, 165 and 166.

Since the skew adjust circuits 148 to 158 each have similar structure and function, an exemplary configuration only for skew adjust circuit 148 is shown in FIG. 3. The skew adjust circuit 148 generally includes a set of set/reset flip-flops 183, 184, 185, 186, 187 and 188 and a buffer structure 189. The buffer structure 189 adds a variable amount of delay to the input clock signal 160 to produce the output clock signal 161. The set/reset flip-flops 183, 184, 185, 186, 187 and 188 provide output signals 190, 191, 192, 193, 194 and 195 to the buffer structure 189. The output signals 190, 191, 192, 193, 194 and 195 determine the amount of delay that the buffer structure 189 adds to the input clock signal 160 to produce the output clock signal 161. The set/reset flip-flops 183, 184, 185, 186, 187 and 188 change the output signals 190, 191, 192, 193, 194 and 195 in response to the skew adjust signal 167 to increase or decrease the amount of delay that the buffer structure 189 adds to the input clock signal 160 to produce output clock signal 161.

The buffer structure 189 generally includes inverters 196 and 197, a set of transistor switches 198, 199, 200, 201, 202 and 203 and a set of capacitors 204, 205, 206, 207, 208 and 209. The output of inverter 196 connects to the input of inverter 197 across signal line 210. The input of inverter 196 connects to the input clock signal 160. The inverter 196 inverts the input clock signal 160 and sends it across signal line 210 to the inverter 197, which inverts the clock signal again and produces it as output clock signal 161.

The transistor switches 198, 199, 200, 201, 202 and 203 connect between signal line 210 and the capacitors 204, 205, 206, 207, 208 and 209, respectively, which in turn connect to ground 211. When any of the transistor switches 198, 199, 200, 201, 202 or 203 is closed, its respective capacitor 204, 205, 206, 207, 208 or 209 applies a capacitive load to the inverted signal between the inverters 196 and 197. The applied capacitive load causes a delay in the inverted signal on signal line 210, due to the time required to charge and discharge the capacitors 204, 205, 206, 207, 208 and 209.

When few or none of the transistor switches 198 to 203 are closed, then the capacitive load, and thus the delay, applied to the inverted signal is small or minimized. When most or all of the transistor switches 198 to 203 are closed, then the capacitive load, and thus the delay, applied to the inverted signal is large or maximized. By selectively closing or opening the transistor switches 198 to 203, the delay in the inverted signal is increased or decreased in predetermined increments, or steps, determined by the capacitance of the capacitors 204 to 209.

The buffer structure 189 is shown as having six capacitors 204 to 209. Thus, the delay can be adjusted in seven steps, with zero to six added capacitive loads. Any number of capacitors 204 to 209 having any capacitance, however, may be utilized. For greater resolution or smaller steps of possible delay, lower capacitances may be utilized. For a wider range of possible delay, a larger number of capacitors may be utilized.

The transistor switches 198 to 203 are connected to the outputs (OUT) of the set/reset flip-flops 183 to 188, respectively, to receive the output signals 190 to 195. Thus, the transistor switches 198 to 203 are operated by, and the capacitors 204 to 209 (and capacitive loads and delays) are added or subtracted by, the output signals 190 to 195 from the set/reset flip-flops 183 to 188, respectively. Also, there is preferably one set/reset flip-flop 183 to 188 for each transistor switch 198 to 203.

The set inputs (SET) of the upper group of set/reset flip-flops 183, 184 and 185 connect to and receive the set signal 174, and the reset inputs (RESET) of the upper group of set/reset flip-flops 183, 184 and 185 connect to ground 218. The set inputs (SET) of the lower group of set/reset flip-flops 186, 187 and 188 connect to ground 218, and the reset inputs (RESET) of the lower group of set/reset flip-flops 186, 187 and 188 connect to and receive the reset signal 175. In this manner, at initialization, or any other desired time, the upper group of set/reset flip-flops 183, 184 and 185 are set by the set signal 174 to a logic 1 output, and the lower group of set/reset flip-flops 186, 187 and 188 are set by the reset signal 175 to a logic 0 output. In this initial configuration, half of the transistor switches 198, 199 and 200 are turned on, and the other half of the transistor switches 201, 202 and 203 are turned off, so the capacitive loads of half of the capacitors 204, 205 and 206 are applied to the inverted clock signal on signal line 210. In a situation in which the capacitances of the capacitors 204 to 209 are about equal, the initial delay for output clock signal 161 is at a midpoint. Further operation of the clock tree deskew circuit 102 (FIGS. 1 and 2) will adjust the delay forward or backward from this midpoint.

The input clock signal 160 and the enable signal 173 feed into an AND gate 220. The output of the AND gate 220 feeds into the clock input (CLOCK) of each of the set/reset flip-flops 183 to 188. Thus, when the enable signal 173 is asserted logic 1 (i.e. is turned "on"), the input clock signal 160 is passed through the AND gate 220 to drive the set/reset flip-flops 183 to 188. When the enable signal 173 is asserted logic 0 (i.e. is turned "off"), the output of the AND gate 220 is held at logic 0, and the set/reset flip-flops 183 to 188 are not driven. In other words, the output signals of the set/reset flip-flops 183 to 188 are held constant.

The set/reset flip-flops 183 to 188 are preferably negative-edge-active, meaning that the output signal is changed upon the occurrence of a negative edge of the signal fed into the clock input of the set/reset flip-flops 183 to 188. Thus, when the input clock signal 160 drives the clock inputs, and the set signal 174 and the reset signal 175 are not asserted, a logic signal applied at an input (IN) of the set/reset flip-flops 183 to 188 will be latched on the negative edge of the input clock signal 160 and produced at the output (OUT).

The skew adjust signal 167 is provided as the input signal to the set/reset flip-flops 183 and 186, the first flip-flops in the upper and lower groups of set/reset flip-flops, respectively. The input signals to the other set/reset flip-flops 184, 185, 187 and 188 are the output signals 190, 191, 193 and 194, respectively, of the immediately preceding set/reset flip-flops 183, 184, 186 and 187, respectively.

As stated above, when the skew adjust signal 167 is a logic 1, this value indicates that the output clock signal 161 arrived at the skew detect circuit 136 (FIG. 2) before the output clock signal 162 (FIG. 2), so the output clock signal 161 needs to have its delay increased. At initialization of the IC 100 (FIG. 1), when the logic 1 value is received as the skew adjust signal 167 in the first clock cycle by the set/reset flip-flop 183 (first of the upper group of set/reset flip-flops 183, 184 and 185), the output signal 190 of the set/reset flip-flop 183 does not change, since the output signal 190 is initially already a logic 1. On the other hand, when the logic 1 value is received as the skew adjust signal 167 by the set/reset flip-flop 186 (first of the lower group of set/reset flip-flops 186, 187 and 188), the output signal 193 of the set/reset flip-flop 186 changes from the initial logic value of zero to logic 1. The logic 1 values of the output signals 191 and 192 of the set/reset flip-flops 184 and 185 do not change, because the output signals 190 and 191 from the preceding set/reset flip-flops 183 and 184, respectively, were also logic 1. Likewise, the logic 0 values of the output signals 194 and 195 of the set/reset flip-flops 187 and 188 do not change at this time, because the output signals 193 and 194 from the preceding set/reset flip-flops 186 and 187, respectively, were also logic 0. In this manner, the number of the transistor switches 198 to 203 that are "on" increases from three out of six (transistor switches 198, 199 and 200) to four out of six (transistor switches 198, 199, 200 and 201). Therefore, the capacitance applied to the signal line 210 between the two inverters 196 and 197 is increased, and thus, the delay in the output clock signal 161 is increased by one increment. The increase in the delay of the output clock signal 161 either decreases the skew between the output clock signals 161 and 162 (FIG. 2), or delays the output clock signal 161 after the output clock signal 162.

In the second clock cycle, if the skew adjust signal 167 is again a logic 1, then the skew between the output clock signal 161 and the output clock signal 162 (FIG. 2) was decreased in the previous clock cycle, but the output clock signal 161 still arrived before the output clock signal 162 at the skew detect circuit 136 (FIG. 2). In this case, the above steps to delay the output clock signal 161 will be repeated. In this instance, the output signals 190, 191 and 192 of the upper group of set/reset flip-flops 183, 184 and 185, respectively, again do not change from their logic 1 values. The output signal 193 of set/reset flip-flop 176 remains at logic 1, since the skew adjust signal 167 provided to the input of set/reset flip-flop 193 is again logic 1. Additionally, the output signal 195 of set/reset flip-flop 188 remains at logic 0, since the output signal 194 of the preceding set/reset flip-flop 187 was also logic 0 at the beginning of the clock cycle and was applied to the input of the set/reset flip-flop 188. However, the output signal 194 of set/reset flip-flop 187 changes from logic 0 to logic 1, since the output signal 193 of the preceding set/reset flip-flop 186 was also logic 1 at the beginning of the clock cycle. In this manner, another one of the transistor switches (transistor switch 202, connected to the set/reset flip-flop 187) is turned "on." Thus, another capacitive load (due to capacitor 208) is added to the signal line 210 between the inverters 196 and 197, and the output clock signal 161 is delayed by another increment.

In the third clock cycle, if the skew adjust signal 167 is logic 1 again, then the above procedure is repeated once more to turn on the last transistor switch 203, add the last capacitive load (capacitor 209) to the signal line 210 and delay the output clock signal 161 by yet another increment. At this point, in this configuration, the maximum delay has been added to the output clock signal 161. If the design of the IC 100 (FIG. 1) accurately anticipated the maximum skew that the clock tree 108 or 110 (FIG. 1) could experience, then the skew between output clock signals 161 and 162 (FIG. 2) should be minimized.

On the other hand, in the first clock cycle, if the skew adjust signal 167 is logic 0, then the above described procedure operates to turn "off" one of the transistor switches 198, 199 and 200 that was initially "on." When the logic 0 value of the skew adjust signal 167 is applied as the input to the set/reset flip-flop 183, the set/reset flip-flop 183 latches the logic 0 value and provides it as the output signal 190 of the set/reset flip-flop 183. The logic 1 values of the output signals 191 and 192 of the set/reset flip-flops 184 and 185 do not change, since the output signals 190 and 191 that were received from the preceding set/reset flip-flops 183 and 184, respectively, were also logic 1 at the beginning of the clock cycle. Additionally, none of the output signals 193, 194 and 195 of the lower group of set/reset flip-flops 186, 187 and 188, respectively, change, since they were all logic 0 at the beginning of the clock cycle. In this manner, the number of transistor switches that are "on" is changed from three out of six (transistor switches 198, 199 and 200) to two out of six (transistor switches 199 and 200). Thereby, one of the capacitive loads (due to capacitors 204, 205 or 206) is removed from the signal line 210, and the delay of the output clock signal 161 is reduced.

As described above, a logic 0 value on the skew adjust signal 167 indicates that the output clock signal 161 arrived at the skew detect circuit 136 (FIG. 2) after the output clock signal 162 (FIG. 2). Therefore, the reduction in the delay of the output clock signal 161 will reduce the skew between the output clock signals 161 and 162 and/or cause the output clock signal 161 to precede, instead of follow, the output clock signal 162 in the next clock cycle.

If the skew adjust signal 167 in the subsequent clock cycle is still logic 0, then the above procedure operates to turn off the next transistor switch 199. In this clock cycle, the output signal 192 of set/reset flip-flop 185 remains logic 1, and the output signal 190 of set/reset flip-flop 183 remains logic 0. The logic 0 of the output signal 190 of set/reset flip-flop 183, however, propagates through the set/reset flip-flop 184 to the output signal 191 thereof. Thus, the transistor switch 199 is turned off, the capacitive load (due to capacitor 205) is removed from the signal line 210 and the delay of output clock signal 161 is further reduced.

If the skew adjust signal 167 is a logic 1 in the first clock cycle and a logic 0 in the second clock cycle, then the capacitive load of one of the capacitors 204 to 209 will be added to the signal line 210 in the first clock cycle, and the capacitive load of one of the capacitors 204 to 209 will be removed from the signal line 210 in the second clock cycle. In this situation, the logic 1 value for the skew adjust signal 167 indicates that the output clock signal 161 preceded the output clock signal 162 (FIG. 2) at the skew detect circuit 136 (FIG. 2) in the first clock cycle, and the logic 0 value for the skew adjust signal 167 indicates that the output clock signal 161 followed the output clock signal 162 in the second clock cycle. In other words, the skew between the output clock signals 161 and 162 was initially so small that the increase in the delay of the output clock signal 161 in the first clock cycle caused the output clock signal 161 to be delayed behind the output clock signal 162. Then the decrease in the delay of the output clock signal 161 in the second clock cycle caused the output clock signal 161 to return to its previous condition of preceding the output clock signal 162. In this situation, the output clock signal 161 will continue to bounce back and forth between preceding and following the output clock signal 162, unless the skew adjust circuit 148 is prevented from further changing the output clock signal 161. Although the clock skew between output clock signals 161 and 162 will be relatively minimal, it is undesirable to permit such oscillation of the clock signals. Therefore, after a predetermined number of clock cycles, it is advantageous to turn "off" the enable signal 173 to prevent further operation of the set/reset flip-flops 183 to 188.

The enable signal 173 is preferably turned back "on" when certain conditions change (e.g. increased or decreased temperature) that may alter the clock tree skew. In this case, adjustment of the delay of the output clock signal 161 is performed in a similar manner as upon initialization of the IC 100 (FIG. 1).

Since the skew detect circuits 136 to 146 (FIG. 2) each have similar structure and function, an exemplary configuration only for skew detect circuit 136 is shown in FIG. 4. The skew detect circuit 136 is generally conventional and includes two sets of delay buffers, or inverters, 226a–226f and 228a–228f, a pass gate 230, a keeper cell 232 and an output buffer 234. The output clock signal 161 is fed through the delay buffers 226a–226f, and the output clock signal 162 is fed through the delay buffers 228a–228f. The skew adjust signal 167 is produced by the output buffer 234. The delay buffers 226a–226f and 228a–228f cause the skew adjust signal 167 to be produced with appropriate timing to be latched by the set/reset flip-flops 183 and 186 (FIG. 3).

The delay buffers 226a–226f are connected to each other in series, with the output clock signal 161 connected to the input of the first delay buffer 226a. The output of the last delay buffer 226f is connected to the pass gate 230. The pass gate 230 also connects to the keeper cell 232 to pass the output signal of the delay buffer 226f to the keeper cell 232 when the pass gate 230 is closed, or turned "on." The pass gate 230 includes a positive-active transistor 236 and a negative-active transistor 238 connected in parallel, such that they are closed when a logic 1 signal activates transistor 236 and a logic 0 signal activates transistor 238. The keeper cell 232 connects to the output buffer 234 to provide the desired value of the skew adjust signal 167 (inverted) to the output buffer 234.

The keeper cell 232 includes two inverters 246 and 247 connected in a loop, such that the input of inverter 246 connects to the output of inverter 247, and the output of inverter 246 connects to the input of inverter 247. The input of the inverter 246 also forms the input of the keeper cell 232, and the output of the inverter 246 also forms the output of the keeper cell 232. In this manner, since the inverter 247 feeds back into the inverter 246, the inverters 246 and 247 maintain the previously received signal as long as no new signal is applied to the keeper cell 232 as described below. The output buffer 234 inverts the output signal of the keeper cell 232 and provides the inverted signal as the skew adjust signal 167 during the time that no new signal is applied to the keeper cell 232. The timing of the skew detect circuit 136 and the skew adjust circuit 148 (FIG. 3) are such that the skew adjust signal 167 is latched by the set/reset flip-flops 183 and 186 (FIG. 3) during this time.

The delay buffers 228a–228f are connected to each other in series, with the output clock signal 162 connected to the input of the first delay buffer 228a. Outputs of the second-to-last delay buffer 228e and the last delay buffer 228f are connected to transistors 236 and 238, respectively, of the pass gate 230. Control signals from the delay buffers 228e and 228f control the transistors 236 and 238, respectively, to turn "on" and "off" the pass gate 230 to permit the output signal from the delay buffer 226f to pass through, or not to pass through, the pass gate 230 to the keeper cell 232.

A pull-down transistor 258 is connected between the input of the keeper cell 232 and ground 260. The gate of the pull-down transistor 258 is connected to the output of an OR gate 266. The OR gate 266 receives its inputs from the outputs of the first two delay buffers 226a and 228a. Thus, as long as at least one of the output clock signals 161 and 162 is a logic 0, then at least one of the input signals to the OR gate 266 will be a logic 1, and the output signal from the OR gate 266 will also be a logic 1. In this case, the pull-down transistor 258 will be turned "on," and the input of the keeper cell 232 will be pulled down to ground, so the output signal from the pass gate 230 cannot be applied to the keeper cell 232 at this time. It is only when both of the output clock signals 161 and 162 go "high" (i.e. logic 1) that the pull-down transistor 258 is turned "off," and the output signal from the pass gate 230 is applied to the keeper cell 232.

The output signal from the delay buffer 226f is passed through the pass gate 230 to the keeper cell 232 only when the pass gate 230 is closed, or "on." The pass gate 230 is "on" only when the output signals of the delay buffers 228e and 228f are logic 1 and logic 0, respectively. The output signals of the delay buffers 228e and 228f are logic 1 and logic 0, respectively, only when the output clock signal 162 is logic 0, and the logic 0 has propagated through the delay buffers 228a–228f. In other words, the output signal of the delay buffer 226f can pass through the pass gate 230 to the keeper cell 232 only when the output clock signal 162 is logic 0. However, the pull-down transistor 258 permits the keeper cell 232 to receive the output signal from the pass gate 230 only when both of the output clock signals 161 and 162 are logic 1. Due to the delay of the output clock signal 162 through the delay buffers 228a–228f, however, there is a "window of opportunity" for a short time interval after the output clock signal 162 transitions from logic 0 to logic 1 for the output signal of the delay buffer 226f to pass through the pass gate 230 before the pass gate 230 is turned "off." The pull-down transistor 258 is turned "off" at the beginning of the "window of opportunity," so that the output signal from the pass gate 230 can be latched by the keeper cell 232. The pull-down transistor 258 remains "off" for an additional period of time during which the keeper cell 232 "holds" the value of the most recent output signal from the pass gate 230. During this period of time, the output buffer 234 supplies the skew adjust signal 167 to the skew adjust circuit 148 (FIGS. 2 and 3).

If the clock skew between the output clock signals 161 and 162 is such that the output clock signal 161 precedes the output clock signal 162, then the output clock signal 161 will transition from logic 0 to logic 1 before the output clock signal 162 does the same. Therefore, since the number of delay buffers 226*a*–226*f* is the same as the number of delay buffers 228*a*–228*f*, the output signal of delay buffer 226*f* will become logic 1 for a time approximately equal to the time of the clock skew prior to the turning "off" of the pass gate 230. In this case, the logic 1 value will be latched by the keeper cell 232 and held at this logic value until the pull-down transistor 258 turns on. During this time, the inverter 246 inverts the logic 1 to logic 0, the output buffer 234 inverts the logic 0 to logic 1 for the skew adjust signal 167, and the set/reset flip-flops 183 and 186 (FIG. 3) latch the skew adjust signal 167.

If the clock skew between the output clock signals 161 and 162 is such that the output clock signal 161 follows the output clock signal 162, then the output clock signal 161 will transition from logic 0 to logic 1 after the output clock signal 162 does the same. Therefore, the output signal of the delay buffer 226*f* will still be logic 0 at the time of the turning "off" of the pass gate 230. In this case, the logic 0 value will be latched by the keeper cell 232 and held at this logic value until the pull-down transistor 258 turns "on." Between the time that the keeper cell 232 latches the logic 0 and the time that the pull-down transistor 258 turns "on," the inverter 246 inverts the logic 0 to logic 1, the output buffer 234 inverts the logic 1 to logic 0 for the skew adjust signal 167, and the set/reset flip-flops 183 and 186 (FIG. 3) latch the skew adjust signal 167.

An exemplary clock tree deskew situation with different examples of clock skew between the output clock signals 161 to 166 (originating in FIG. 2) is shown in FIG. 5. In the first pair 268 of output clock signals, at the beginning of clock cycle 270, output clock signal 161 precedes the output clock signal 162, so the rising edge 272 of output clock signal 161 is shown to have been moved forward at the beginning of clock cycle 274. In the second pair 276 of output clock signals, at the beginning of clock cycle 270, output clock signal 162 follows the output clock signal 163, so the rising edge 278 of output clock signal 162 is shown to have been moved backward at the beginning of clock cycle 274. In the third pair 280 of output clock signals, at the beginning of clock cycle 270, output clock signal 163 precedes the output clock signal 164, so the rising edge 282 of output clock signal 163 is shown to have been moved forward at the beginning of clock cycle 274. In the fourth pair 284 of output clock signals, at the beginning of clock cycle 270, output clock signal 164 precedes the output clock signal 165, so the rising edge 286 of output clock signal 164 is also shown to have been moved forward at the beginning of clock cycle 274. In the fifth pair 288 of output clock signals, at the beginning of clock cycle 270, output clock signal 165 precedes the output clock signal 166, so the rising edge 290 of output clock signal 165 is also shown to have been moved forward at the beginning of clock cycle 274. In the sixth pair 292 of output clock signals, at the beginning of clock cycle 270, output clock signal 166 follows the output clock signal 161, so the rising edge 294 of output clock signal 166 is shown to have been moved backward at the beginning of clock cycle 274.

The above procedure repeats during clock cycle 274 to arrive at the relative clock tree skew shown at the beginning of clock cycle 296, and again during clock cycle 296 to arrive at the relative clock tree skew shown at the end of clock cycle 296. At the end of clock cycle 296, the output clock signals 161 through 166 will have been adjusted three times, and the overall clock tree skew will be generally minimized. It is at this point that it is preferable to turn "off" the enable signal 173 (FIGS. 2 and 3), as described above, to prevent further unnecessary adjustments to the output clock signals 161 through 166.

The present invention has the advantage of correcting for undesired clock tree skew without having to fully anticipate the probable clock tree skew variations at the time of designing the IC 100 (FIG. 1). Anticipating the probable clock tree skew at the time of designing the IC 100 permits only a onetime static adjustment of the clock signals in the clock tree. By dynamically adding and/or removing delay from one or more of the clock signals in a clock tree, however, the invention can achieve better minimization of the overall clock tree skew than can the onetime static adjustment. Thus, a further advantage is that the IC 100 will be rated for a greater clock speed, or frequency, of operation, since timing is more tightly controlled. Another advantage is that the invention can dynamically re-adjust the clock tree skew in situations where changing conditions (e.g. increasing or decreasing temperature) can alter the clock tree skew beyond desired tolerances during the normal operation of the IC 100.

A trade-off for these advantages is that the clock tree deskew circuit 102 (FIG. 1) takes up valuable space in the silicon for the IC 100. Therefore, the clock tree deskew circuit 102 would preferably not be used across the entire IC 100 to deskew all clock signals throughout the IC 100. Instead, the clock tree deskew circuit 102 is preferably used to deskew signals only in select portions of the IC 100 where clock timing is critical between certain given points that need to communicate with each other. However, given the constant need for faster ICs, this trade-off is insignificant.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiments set forth above.

The invention claimed is:

1. A method of controlling skew between clock signals in an integrated circuit having a plurality of synchronized clocked circuit components operated in synchronization by the clock signals, the clock signals being generated in plurality of levels of a clock tree in the integrated circuit, at least a portion of the clock signals being skewed from each other, comprising the steps of:

pairing each clock signal with at least one other clock signal;

detecting which clock signal of each pair precedes the other clock signal of the pair; and changing a timing of one of the clock signals of at least one pair to reduce the skew between the clock signals of the at least one pair by adjusting the one of the clock signals toward the other clock signal of the pair.

2. A method as defined in claim 1 further comprising the step of:

minimizing the skew between the clock signals by repeating the detecting and changing steps over a period of time.

3. A method as defined in claim 2 further comprising the step of:
    after the period of time, stopping the repeating of the changing step.

4. A method as defined in claim 3 further comprising the steps of:
    subjecting the integrated circuit to changing conditions that alter the skew between at least a portion of the clock signals; and
    minimizing the skew between the clock signals by repeating the detecting and changing steps.

5. A method as defined in claim 1 further comprising the steps of:
    upon detecting that a first one of the clock signals precedes a second one of the clock signals in one of the pairs, increasing a delay of the first one of the clock signals; and
    upon detecting that the second one of the clock signals precedes the first one of the clock signals in the one of the pairs, decreasing the delay of the first one of the clock signals.

6. A method as defined in claim 5 further comprising the steps of:
    adding a first capacitive load to the first one of the clock signals to increase the delay of the first one of the clock signals; and
    removing a second capacitive load from the first one of the clock signals to decrease the delay of the first one of the clock signals.

7. A method as defined in claim 1, wherein the plurality of clock signals includes at least three clock signals, further comprising the step of:
    pairing each clock signal with one other clock signal in two different pairs of clock signals.

8. A method of controlling skew between a plurality of clock signals in an integrated circuit having a plurality of synchronized clocked circuit components operated in synchronization by the clock signals, at least a portion of the clock signals being skewed from each other, comprising the steps of:
    arranging the clock signals in a sequential loop;
    pairing each clock signal with a previous clock signal in one pair and with a next clock signal in another pair in the sequential loop;
    determining a skew between the clock signals of at least one pair; and
    changing a timing of one of the clock signals of the at least one pair to reduce the skew between the clock signals of the at least one pair by adjusting the one of the clock signals toward the other clock signal of the pair.

9. A method of controlling skew between clock signals in an integrated circuit having a plurality of synchronized clocked circuit components operated in synchronization by the clock signals, at least a portion of the clock signals being skewed from each other, the clock signals including clock signal 1 through clock signal N, comprising the steps of:
    pairing each clock signal n with clock signal n+1, where n equals 1 to N−1;
    detecting whether the clock signal n precedes or follows the clock signal n+1;
    changing the timing of the clock signal n to reduce the skew between the clock signals n and n+1 by adjusting the clock signal n toward the clock signal n+1 depending on whether the clock signal n preceded or followed the clock signal n+1;
    pairing the clock signal N with the clock signal 1;
    detecting whether the clock signal N precedes or follows the clock signal 1; and
    changing the timing of the clock signal N to reduce the skew between the clock signals N and 1 by adjusting the clock signal N toward the clock signal 1 depending on whether the clock signal N preceded or followed the clock signal 1.

10. An integrated circuit having a clock tree and a plurality of synchronized clocked circuit components, the clock tree including a plurality of levels of clock signals, each clock signal having a delay characteristic relative to the other clock signals, the delay characteristics of the clock signals defining a clock tree skew, the plurality of synchronized clocked circuit components each having a clock input receiving one of the clock signals from one of the levels of the clock tree, and the plurality of synchronized clocked circuit components having timing requirements for synchronized operation, comprising:
    a clock tree deskew circuit connected to the clock tree and the synchronized clocked circuit components to receive the clock signals that are received by the synchronized clocked circuit components, the clock tree deskew circuit including:
        a plurality of skew detect circuits each operative to compare one of the clock signals to at least one other one of the clock signals to determine whether the one of the clock signals of pairs of the clock signals precedes or follows the other one of the clock signals of the pair; and
        a plurality of skew adjust circuits operative to change the delay characteristic of one of the clock signals of at least one of the pairs to reduce the clock tree skew by adjusting the changed clock signal toward the other one of the clock signals with which the changed clock signal is paired.

11. An integrated circuit as defined in claim 10 wherein:
    the clock tree deskew circuit sends a plurality of output clock signals to the plurality of synchronized clocked circuit components;
    each skew adjust circuit corresponds to and supplies one of the output clock signals; and
    each skew detect circuit corresponds to and connects to one of the skew adjust circuits to receive the corresponding output clock signal from the corresponding skew adjust circuit, each skew detect circuit also receiving one of the other output clock signals from one of the other skew adjust circuits, each skew detect circuit determining whether the corresponding output clock signal precedes the other output clock signal and supplying an adjustment signal to the corresponding skew adjust circuit indicative of the determination of whether the corresponding output clock signal precedes the other output clock signal.

12. An integrated circuit as defined in claim 11 wherein:
    each skew adjust circuit receives the adjustment signal from the corresponding skew detect circuit, shifts the corresponding output clock signal in a first direction when the adjustment signal has a first value and shifts the corresponding output clock signal in a second direction when the adjustment signal has a second value.

13. An integrated circuit as defined in claim 12 wherein:
    the plurality of output clock signals include output clock signal 1 through output clock signal N;
    each output clock signal n is paired with output clock signal n+1 for skew detect circuit n to determine whether the output clock signal n precedes the output clock signal n+1, where n equals 1 to N−1;

the skew detect circuit n sends adjustment signal n to skew adjust circuit n indicating whether the output clock signal n preceded the output clock signal n+1;

skew adjust circuit n receives adjustment signal n and adjusts output clock signal n in response thereto;

the output clock signal N is paired with the output clock signal 1 for a skew detect circuit N to determine whether the output clock signal N precedes the output clock signal 1;

the skew detect circuit N sends an adjustment signal N to a skew adjust circuit N indicating whether the output clock signal N preceded the output clock signal 1; and the skew adjust circuit N receives the adjustment signal N and adjusts the output clock signal N in response thereto.

14. An integrated circuit as defined in claim 11 further comprising:

a delay buffer connected to one of the skew adjust circuits to receive the corresponding output clock signal therefrom and to delay the corresponding output clock signal to form a desired clock tree skew.

15. An integrated circuit as defined in claim 10 wherein:

the clock tree deskew circuit repeatedly determines the skew between pairs of the clock signals and repeatedly changes the delay characteristic of one of the clock signals of at least one of the pairs to minimize the clock tree skew over a period of time.

16. An integrated circuit as defined in claim 15 wherein:

after the period of time has elapsed, the clock tree deskew circuit stops changing the delay characteristics of any of the clock signals.

17. An integrated circuit as defined in claim 16 wherein:

after the clock tree deskew circuit stops changing the delay characteristics of the clock signals, when a condition of the integrated circuit changes that alters the delay characteristics of any of the clock signals, then the clock tree deskew circuit restarts the changing of the delay characteristics of the clock signals to minimize the clock tree skew again.

18. An integrated circuit as defined in claim 10 wherein:

the clock tree deskew circuit adjusts the changed clock signal by adding delay to or subtracting delay from the changed clock signal.

19. An integrated circuit as defined in claim 18 wherein:

the clock tree deskew circuit adds delay to the changed clock signal by adding a first capacitive load to the changed clock signal, and the clock tree deskew circuit subtracts delay from the changed clock signal by removing a second capacitive load from the changed clock signal.

20. An integrated circuit as defined in claim 19 wherein:

the clock tree deskew circuit includes a plurality of capacitive loads and a plurality of switches, each switch corresponding to one of the capacitive loads and connected between the corresponding capacitive load and one of the clock signals;

closing one of the switches adds the corresponding capacitive load to the clock signal; and opening one of the switches removes the corresponding capacitive load from the clock signal.

21. A clock tree deskew circuit, for deskewing clock signals of a clock tree that synchronize operation of synchronized clocked circuit components in an integrated circuit, comprising:

a plurality of clock signal inputs receiving a plurality of clock signals from the clock tree, the clock signals having timing characteristics that define a clock tree skew;

a plurality of skew adjust circuits, each skew adjust circuit corresponding and connecting to one of the clock signals, each skew adjust circuit buffering and delaying the corresponding clock signal, and each skew adjust circuit increasing or decreasing the delay of the corresponding clock signal in response to an adjustment signal to reduce the clock tree skew; and a plurality of skew detect circuits, each skew detect circuit corresponding and connected to one of the skew adjust circuits, each skew detect circuit receiving a pair of the clock signals that includes the corresponding clock signal buffered and delayed by the corresponding skew adjust circuit and one of the other clock signals from one of the other skew adjust circuits, each skew detect circuit comparing the corresponding clock signal to the other clock signal of the pair to determine whether the corresponding clock signal precedes or follows the other clock signal of the pair, and each skew detect circuit issuing the adjustment signal to the corresponding skew adjust circuit depending on the determination of whether the corresponding clock signal preceded or followed the other clock signal of the pair.

22. A clock tree deskew circuit as defined in claim 21 wherein:

the skew detect circuits repeatedly determine whether the corresponding clock signal preceded or followed the other clock signal for each of the pairs of clock signals and repeatedly issue the adjustment signals depending on the determinations of whether the corresponding clock signal preceded or followed the other clock signal for the pairs of clock signals; and the skew adjust circuits minimize the clock tree skew by repeatedly increasing or decreasing the delay of the corresponding clock signals in response to the adjustment signals.

23. A method as defined in claim 8 further comprising:

detecting whether the timing of a first clock signal of each pair precedes or follows the timing of a second clock signal of each pair; and changing the timing of the first clock signal depending on whether the first clock signal preceded or followed the second clock signal.

24. A method as defined in claim 23 further comprising:

upon detecting that a first one of the clock signals precedes a second one of the clock signals in one of the pairs, increasing a delay of the first one of the clock signals; and upon detecting that the second one of the clock signals precedes the first one of the clock signals in the one of the pairs, decreasing the delay of the first one of the clock signals.

25. A method as defined in claim 23, wherein the plurality of clock signals includes at least three clock signals, further comprising:

pairing each clock signal with one other clock signal in two different pairs of clock signals.

26. An integrated circuit having a clock tree and a plurality of synchronized clocked circuit components, the clock tree including a plurality of levels of clock signals, each clock signal having a delay characteristic relative to the other clock signals, the delay characteristics of the clock signals defining a clock tree skew, the plurality of synchronized clocked circuit components each having a clock input receiving one of the clock signals from one of the levels of the clock tree, and the plurality of synchronized clocked circuit components having timing requirements for synchronized operation, comprising:

a clock tree deskew circuit connected to the clock tree and the synchronized clocked circuit components to receive the clock signals that are received by the synchronized clocked circuit components, the clock tree deskew circuit arranging the clock signals in a loop and combining the clock signals in pairs in which each clock signal is included in a pair with a next clock signal and in another pair with a previous clock signal, the clock tree deskew circuit including:

a plurality of skew detect circuits each corresponding to one of the clock signals and receiving the pair of clock signals which includes the corresponding clock signal and the next clock signal in the loop, each skew detect circuit operative to compare the received pair of clock signals to each other to determine a skew therebetween; and a plurality of skew adjust circuits each corresponding to one of the clock signals and to one of the skew detect circuits, each skew adjust circuit being operative to change the delay characteristic of the corresponding clock signal to reduce the skew determined by the corresponding skew detect circuit.

27. An integrated circuit as defined in claim 26 wherein:

the clock tree deskew circuit sends a plurality of output clock signals to the plurality of synchronized clocked circuit components;

each skew adjust circuit corresponds to and supplies one of the output clock signals; and each skew detect circuit corresponds to and connects to one of the skew adjust circuits to receive the corresponding output clock signal from the corresponding skew adjust circuit, each skew detect circuit also receiving one of the other output clock signals from one of the other skew adjust circuits, each skew detect circuit determining whether the corresponding output clock signal precedes the other output clock signal and supplying an adjustment signal to the corresponding skew adjust circuit indicative of the determination of whether the corresponding output clock signal precedes the other output clock signal.

28. An integrated circuit as defined in claim 27 wherein:

each skew adjust circuit receives the adjustment signal from the corresponding skew detect circuit, shifts the corresponding output clock signal in a first direction when the adjustment signal has a first value and shifts the corresponding output clock signal in a second direction when the adjustment signal has a second value.

29. An integrated circuit as defined in claim 28 wherein:

the plurality of output clock signals include output clock signal 1 through output clock signal N;

each output clock signal n is paired with output clock signal n+1 for skew detect circuit n to determine whether the output clock signal n precedes the output clock signal n+1, where n equals 1 to N−1;

the skew detect circuit n sends adjustment signal n to skew adjust circuit n indicating whether the output clock signal n preceded the output clock signal n+1;

skew adjust circuit n receives adjustment signal n and adjusts output clock signal n in response thereto;

the output clock signal N is paired with the output clock signal 1 for a skew detect circuit N to determine whether the output clock signal N precedes the output clock signal 1;

the skew detect circuit N sends an adjustment signal N to a skew adjust circuit N indicating whether the output clock signal N preceded the output clock signal 1; and the skew adjust circuit N receives the adjustment signal N and adjusts the output clock signal N in response thereto.

30. An integrated circuit as defined in claim 26 wherein:

the clock tree deskew circuit repeatedly determines the skew between pairs of the clock signals and repeatedly changes the delay characteristic of one of the clock signals of at least one of the pairs to minimize the clock tree skew over a period of time.

31. An integrated circuit as defined in claim 26 wherein:

the clock tree deskew circuit adjusts the changed clock signal by adding delay to or subtracting delay from the changed clock signal.

32. A clock tree deskew circuit, for deskewing clock signals of a clock tree that synchronize operation of synchronized clocked circuit components in an integrated circuit, comprising:

a plurality of clock signal inputs receiving a plurality of clock signals from the clock tree, the clock signals having timing characteristics that define a clock tree skew and being arranged in a sequential loop;

a plurality of skew adjust circuits, each skew adjust circuit corresponding to and connecting to one of the clock signals, each skew adjust circuit buffering and delaying the corresponding clock signal, and each skew adjust circuit increasing or decreasing the delay of the corresponding clock signal in response to an adjustment signal to reduce the clock tree skew; and a plurality of skew detect circuits, each skew detect circuit corresponding to and connected to one of the skew adjust circuits, each skew detect circuit receiving a pair of the clock signals that includes the corresponding clock signal buffered and delayed by the corresponding skew adjust circuit and a next one of the clock signals in the loop, each skew detect circuit comparing the pair of clock signals to each other to determine a skew therebetween, and each skew detect circuit issuing the adjustment signal to the corresponding skew adjust circuit depending on the determination of the skew.

* * * * *